(12) United States Patent
Herr

(10) Patent No.: US 6,865,639 B2
(45) Date of Patent: Mar. 8, 2005

(54) SCALABLE SELF-ROUTING SUPERCONDUCTOR SWITCH

(75) Inventor: Quentin P. Herr, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 484 days.

(21) Appl. No.: 10/028,049

(22) Filed: Dec. 19, 2001

(65) Prior Publication Data

US 2003/0115401 A1 Jun. 19, 2003

(51) Int. Cl.[7] .............................................. G06F 13/00
(52) U.S. Cl. ......................... 710/317; 340/14.1; 326/1
(58) Field of Search ................................ 710/316, 317; 326/1, 4; 340/14.1, 14.4

(56) References Cited

U.S. PATENT DOCUMENTS

| | | | |
|---|---|---|---|
| 5,091,905 A | | 2/1992 | Amada |
| 5,345,114 A | * | 9/1994 | Ma et al. ........................ 326/1 |
| 5,434,530 A | | 7/1995 | Ghoshal |
| 5,559,970 A | * | 9/1996 | Sharma ...................... 710/317 |
| 5,625,780 A | * | 4/1997 | Hsieh et al. ................. 710/316 |
| 5,963,351 A | | 10/1999 | Kaplounenko et al. |
| 6,175,749 B1 | | 1/2001 | Wordenweber |
| 6,185,203 B1 | | 2/2001 | Berman |
| 6,526,491 B2 | * | 2/2003 | Suzuoki et al. ............. 711/164 |
| 6,580,359 B1 | * | 6/2003 | Tam .......................... 340/14.1 |

OTHER PUBLICATIONS

Robert Sandell, John Spargo and Michael Leung, "High data rate switch with amplifierchip," IEEE Trans. Appl. Supercond., vol. 9, pp. 2985–2988, Jun. 1999.

Qing Ke, Bruce Dalrymple, Dale Durand, and John Spargo, "Single flux quantum crossbar switch," IEEE Trans. Appl. Supercond., vol. 7, pp. 2968–2971, Jun. 1997.

L. Wittie, D. Zinoviev, G. Sazaklis, and K. Likharev, "CNET: Design of an RSFQ switching network for petaflops–scale computing," IEEE Trans. Appl. Supercond., vol. 9, pp. 4034–4039, Jun. 1999.

S. Yorozu, Y. Hashimoto, H. Numata, S. Nagasawa, and S. Tahara, "System demonstation of a superconducting communication system," IEEE Trans. Appl. Supercond., vol. 9, pp. 2975–2980, Jun. 1999.

* cited by examiner

*Primary Examiner*—Khanh Dang
(74) *Attorney, Agent, or Firm*—Noel F. Heal

(57) ABSTRACT

A crossbar switch includes a cross-point matrix with n input rows of cross-points and m output columns of cross-points. The crossbar switch further includes n decoders connected to the n input rows. Each of the n rows includes a single serial address input, a shift input and a data input. A serial address and data enter the address input and the data input in parallel. A shift sequence is transmitted on the single shift input. The data flows before the shift sequence on the shift input is complete. The data is shifted through the crossbar switch using a clock that is generated on-chip using a clock recovery circuit. The decoder converts a binary address input into a serial address and includes an N-bit counter with a plurality of toggle flip-flops. The crossbar switch is implemented using superconductor digital electronics such as rapid single flux quantum (RSFQ) logic.

17 Claims, 6 Drawing Sheets

SCALABLE SELF-ROUTING SUPERCONDUCTOR SWITCH

FIELD OF THE INVENTION

The present invention relates to switches, and more particularly to a scalable self-routing superconductor switch.

BACKGROUND OF THE INVENTION

Superconductor switches are capable of very high data rates with low power dissipation. Crossbar switches that are implemented using superconductor digital electronics are capable of high data rates per line and are reconfigurable within a few clock cycles. The crossbar switches also have a compact size of a few cubic centimeters and low on-chip power dissipation. Network routers and multiprocessor computers are a primary application of crossbar switches. For these applications, the crossbar switches must be self-routing. Using conventional crossbar switches in routers involves unacceptable overhead for the select logic. Conventional crossbar switches also need a parallel decoder circuit and an interconnect between the decoders and the crossbar switch. The row decoder also has one output connection for each column. In other words, each crosspoint would need to be connected to its own decoder output.

While having high data rates, prior art superconductor switches have made compromises between data rate, power, scalability, total throughput, and reconfiguration time. Robert Sandell, John Spargo, and Michael Leung, "High Data Rate Switch With Amplifier Chip", IEEE Trans. Appl. Supercond., vol. 9, pp. 2985–2988, (June 1999) discloses a switch that operates at 2.5 Gbps and performs self-routing. However, the switch has high decoder and interconnect overhead. Scalability and power dissipation can also be improved.

Qing Ke, Bruce Dalrymple, Dale Durand, and John Spargo, "Single Flux Quantum Crossbar Switch", IEEE Trans. Appl. Supercond. vol. 7, pp. 2968–2971, (June 1997) discloses a switch that employs rapid single flux quantum (RSFQ) logic that enables ultra-high data rates but requires a parallel decoder. In addition, scalability and power dissipation are unacceptable.

L. Wittie, D. Zinoviev, G. Sazaklis, and K. Likharev, "CNET: Design of an RSFQ switching network for petaflops-scale computing," IEEE Trans. Appl. Supercond., vol. 9, pp. 4034–4039, (June 1999) discloses a switch with a multi-stage Batcher-Baynan architecture that is implemented using RSFQ logic. Unfortunately, the switch has relatively high stage and interconnect complexity. Furthermore, the design has not been implemented.

S. Yorozu, Y. Hashimoto, H. Numata, S. Nagasawa, and S. Tahara, "System demonstration of a superconducting communication system," IEEE Trans. Appl. Supercond., vol. 9, pp. 2975–2980, June 1999 discloses a switch that solves the interconnect problem by using a ring architecture. Potential throughput, however, does not compare favorably to crossbar switches.

In RSFQ logic, information is stored in superconductor loops as tiny magnetic flux quanta and a bit is transferred as several picosecond-wide voltage spike with a quantized area of approximately 2.07 mV ps. The tiny and quantized nature of magnetic flux quanta significantly (by several orders of magnitude) reduces crosstalk and power consumption as compared to CMOS devices.

The RSFQ circuit can be considered as consisting of elementary cells or timed gates. Each cell has two or more stable flux states. The cell is fed by SFQ input pulses $S_1$, $S_2, \ldots S_i$ that can arrive from one or more signal lines and a clock timing line T. Each clock pulse marks a boundary between two adjacent clock periods by setting the cell into its initial state. During the new period, an SFQ pulse can arrive or not arrive at each of the cell inputs $S_i$. Arrival of the SFQ pulse at a terminal $S_i$ during the current clock period defines the logic value 1 of the signal $S_i$ while the absence of the pulse during this period defines the logic value 0 of this signal.

RSFQ circuits do not require the exact coincidence of SFQ pulses in time nor is a specified time sequence of the various input signals needed. Each input pulse can either change or not change the internal state of the cell. Input pulses cannot produce an immediate reaction at the output terminal(s) $S_{out}$. Only the clock pulse T is able to fire out the pulse(s) $S_{out}$ corresponding to the internal state of the cell predetermined by the input signal pulses that have arrived during the clock period. The same clock pulse terminates the clock period by resetting the cell into its initial state. An elementary cell of the RSFQ family is approximately equivalent to a typical asynchronous logic circuit coupled with a latch (flip-flop) that stores its output bit(s) until the end of the clock period.

SUMMARY OF THE INVENTION

A crossbar switch according to the invention includes a crossbar matrix with n input rows of cross-points and m output columns of cross-points. The crossbar switch further includes n decoders that are connected to the n input rows. The $n^{th}$ row includes a single serial address input connected to the $n^{th}$ decoder.

In other features of the invention, each of the n rows includes a single shift input and a single data input. A serial address and data enters the address input and the data input in parallel. A shift sequence is transmitted on the shift input. The data flows before the shift sequence on the shift input is complete.

In other features of the invention, the data is shifted through the crossbar switch using a clock that is generated on-chip using a clock recovery circuit. The decoder converts an N-bit binary address input into a serial address. The decoder includes an N-bit counter with N divide-by-2 toggle flip-flops.

In still other features of the invention, the crossbar switch is implemented using superconductor digital electronics. In a preferred embodiment, the crossbar switch is implemented using rapid single flux quantum (RSFQ) logic.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The crossbar switch according to the present invention is preferably implemented using superconductor digital electronics. The crossbar switch is self-routing and is ideally suited for network routers and multi-processor computers. The crossbar switch is capable of 40 Gbps, 100 Gbps or greater data rates per input line. The crossbar switch has a reconfiguration time of a few clock cycles, a potential switch size of 256×256, 1024×1024, or greater and a compact overall size of a few cubic centimeters. The crossbar switch has relatively low power dissipation of 0.1 to 1 Watt.

More particularly, the crossbar switch according to the present invention preferably provides a scalable self-routing switch using rapid single flux quantum (RSFQ) logic, which is a standard logic family. The crossbar switch includes the use of a single serial select input per row. The crossbar switch includes select logic that allows the serial address and the data to enter the crossbar in parallel, which reduces configuration time to the absolute minimum amount of time (in other words, the amount of time that is required to enter the binary address bits and not more). The decoder logic converts the binary address input into a serial address. An on-chip clock is preferably generated using a clock recovery circuit.

Figure 1:
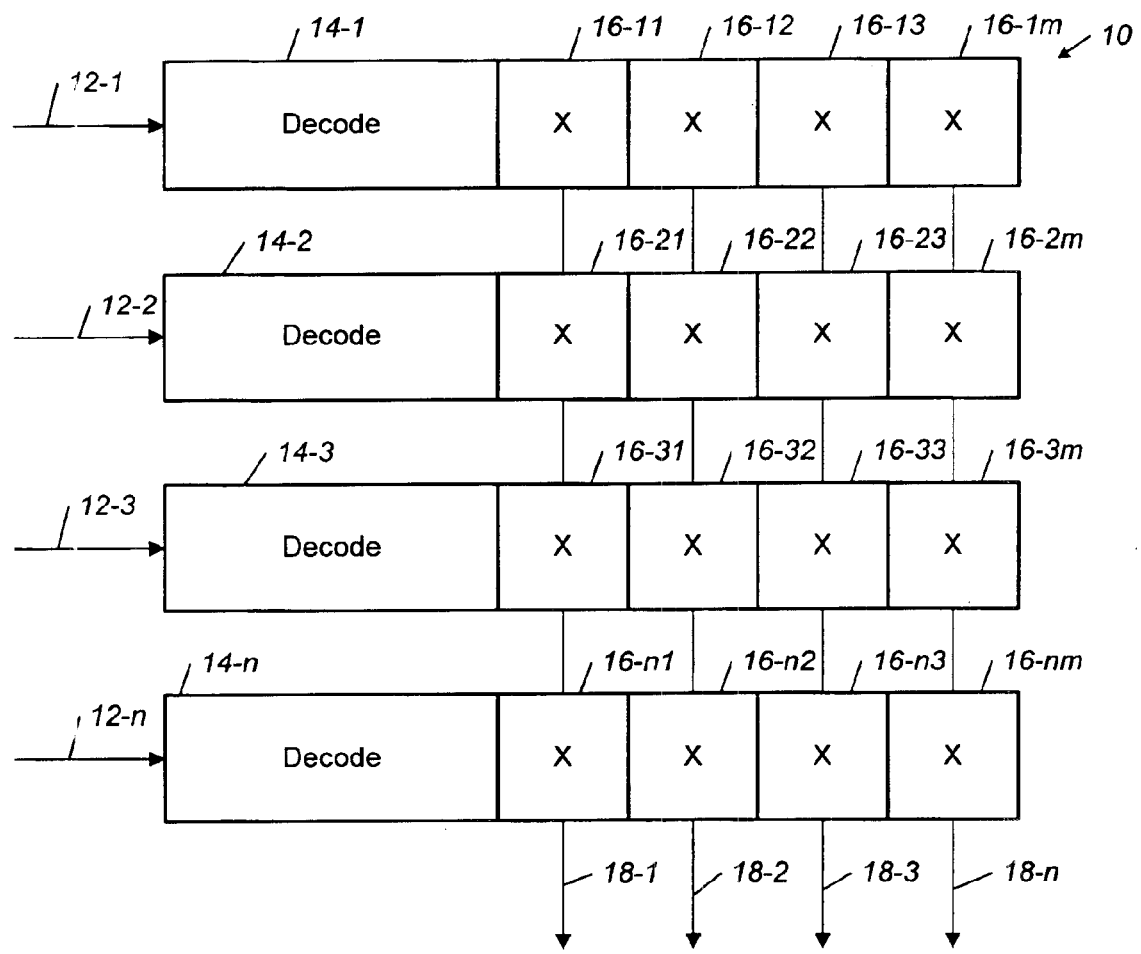
FIG. 1 illustrates a crossbar switch according to the prior art.
Figure 2:
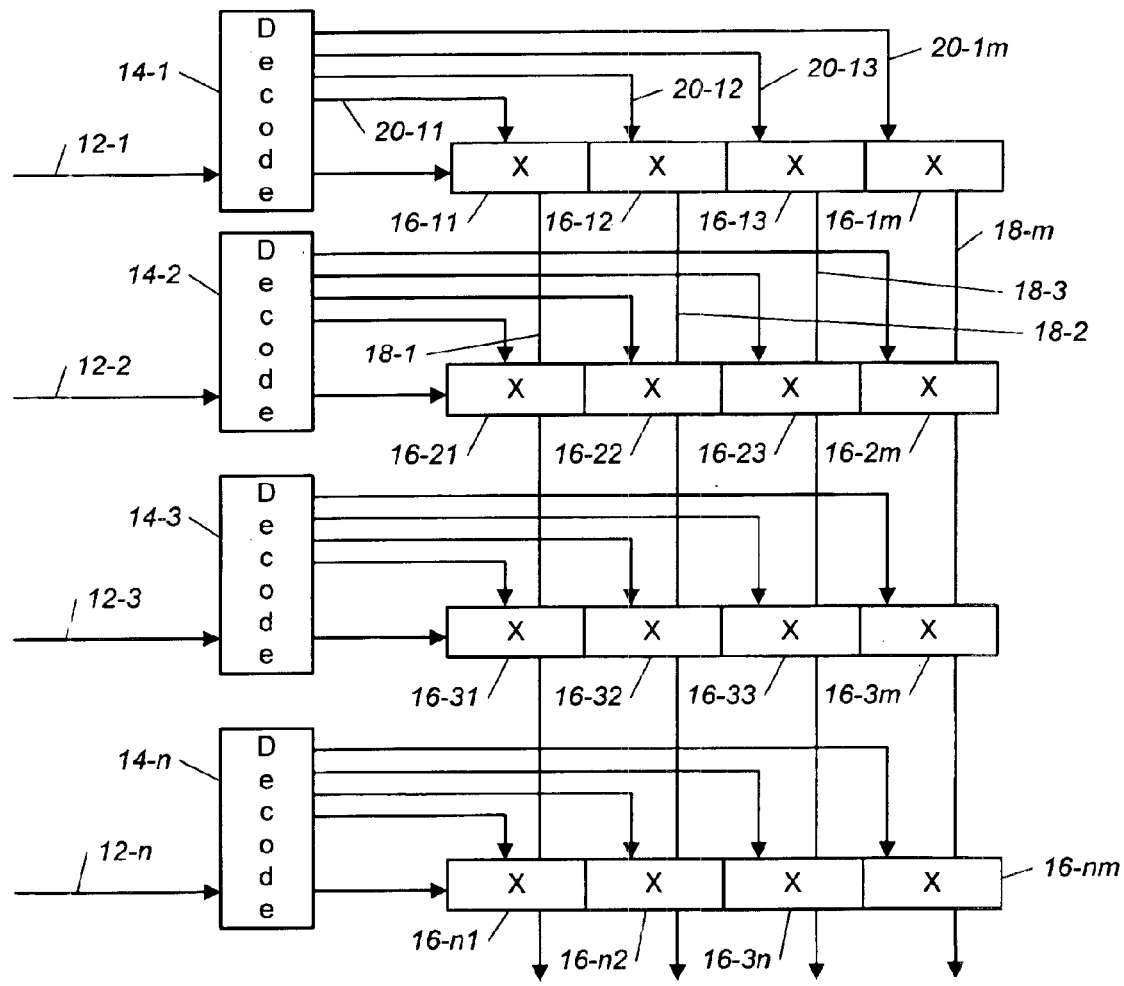
FIG. 2 illustrates the connection of the decoders to the cross-points in the crossbar switch of FIG. 1.

Referring now to FIGS. 1 and 2, a crossbar switch 10 according to the prior art is illustrated. The crossbar switch 10 includes a plurality of inputs 12-1, 12-2, 12-3, ..., 12-n that correspond to the n rows. The n inputs 12 are connected to n decoders 14-1, 14-2, 14-3, ..., 14-n. Outputs of the decoders 14 are connected to cross-points 16-11, 16-12, 16-13, ..., 16-nm that are associated with the n rows and with m output columns 18-1, 18-2, 18-3, 18-m.

In use, serial data including an address header and the data payload enter the crossbar switch 10 on one of the serial inputs 12. Each of the decoders 14 operate independently. One of the decoders 14 (that is associated with the serial input 12 receiving the serial data) strips off the address header, selects one of the output columns 18, and passes the data to the selected output column 18.

Referring now to FIG. 2, the crossbar switch 10 of FIG. 1 is illustrated in further detail. Each decoder 14 includes a separate select input 20-11, 20-12, 20-13, ..., 20-nm for each cross-point 16-11, 16-12, 16-13, ..., 16-nm. As can be appreciated, the individual select inputs 20 that are required to select the crosspoints 16 increase the power dissipation and overall size of the crossbar switch 10. In addition, the select inputs increase the time that is required to configure the crossbar switch 10.

Figure 3:
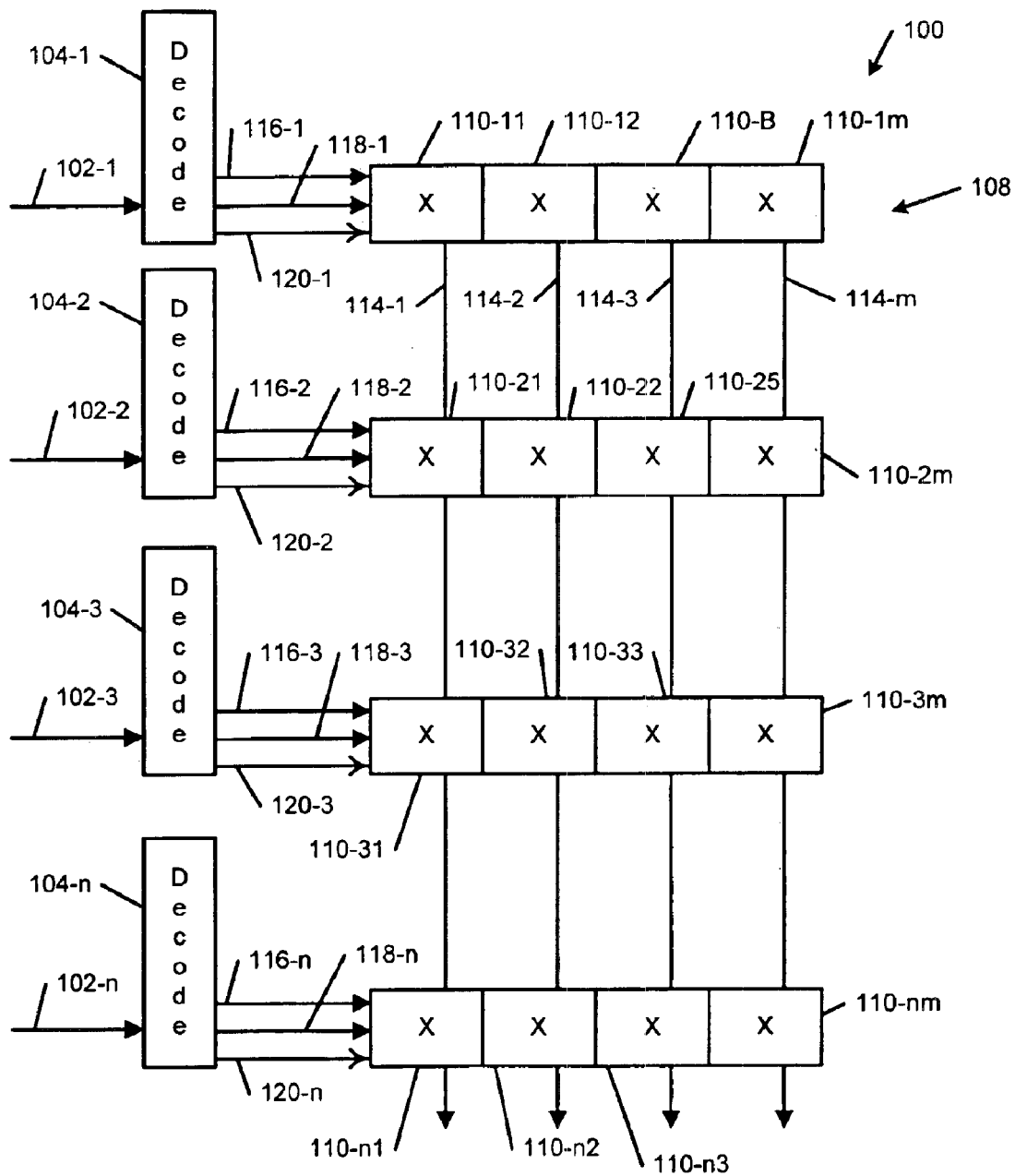
FIG. 3 illustrates a crossbar switch according to the present invention.

Referring now to FIG. 3, a crossbar switch 100 according to the present invention is illustrated. The crossbar switch 100 includes inputs 102-1, 1022, 102-3, ..., 102-n that correspond to the n rows of the crossbar switch 100. The crossbar switch 100 further includes n decoders 104-1, 104-2, 104-3, ..., 104-n that correspond to the n inputs 102. The crossbar switch 100 includes cross-points 110-11, 110-12, 110-13, ..., 110-nm that are connected to output columns 114-1, 114-2, 114-3, ..., 114-m of the crossbar switch 100. The rows (1 ... n) of the crossbar switch 100 include a serial address input 116 (116-1, 116-2, 116-3, ..., 116-n), a shift input 118 (118-1, 118-2, 118-3, ..., 118-n), and a data input 120 (120-1, 120-2, 120-3, ..., 120-n).

Figure 4:
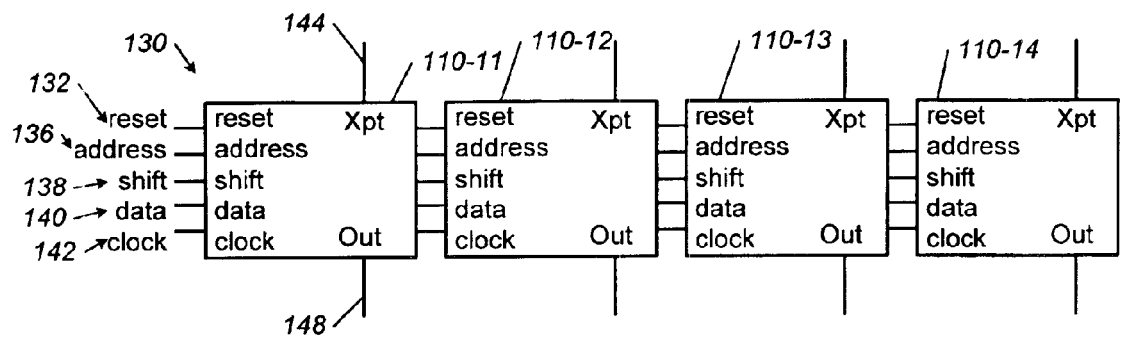
FIG. 4 illustrates the cross-points for a row of the crossbar switch in FIG. 3.
Figure 5:
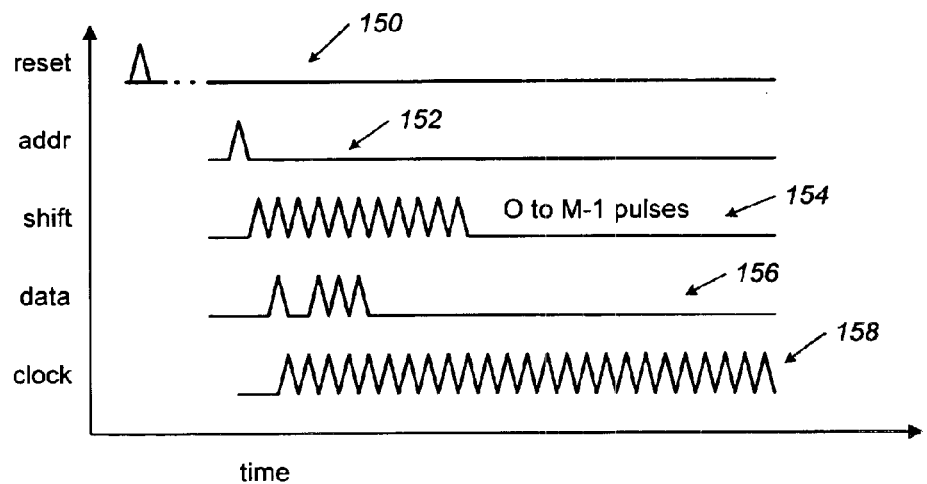
FIG. 5 illustrates control and data signals for the crossbar switch of FIG. 3.

Referring now to FIGS. 4 and 5, an exemplary row 130 of the crosspoints 110 is shown. The cross-points 110 include reset 132, address 136, shift 138, data 140, and clock inputs 142. The cross-points 110 include a cross-point input 144 and a cross-point output 148. The select logic allows the serial address header and the data to enter the crossbar switch 100 in parallel. This means that data can flow before the shift sequencing is completed. In effect, the configuration time of the crosspoints 100 is reduced nearly to zero.

As can be appreciated from FIG. 5, a reset signal 150 deselects all output columns 114. An address input 136 selects column one. M-1 shift pulses 154 select column M. A clock signal 158 shifts data 156 through the array. The clock signal 158 can be generated on-chip using known clock recovery circuits. For example, U.S. Pat. No. 5,963,351 (which is hereby incorporated by reference) illustrates a suitable on-chip clock recovery circuit.

Figure 6:
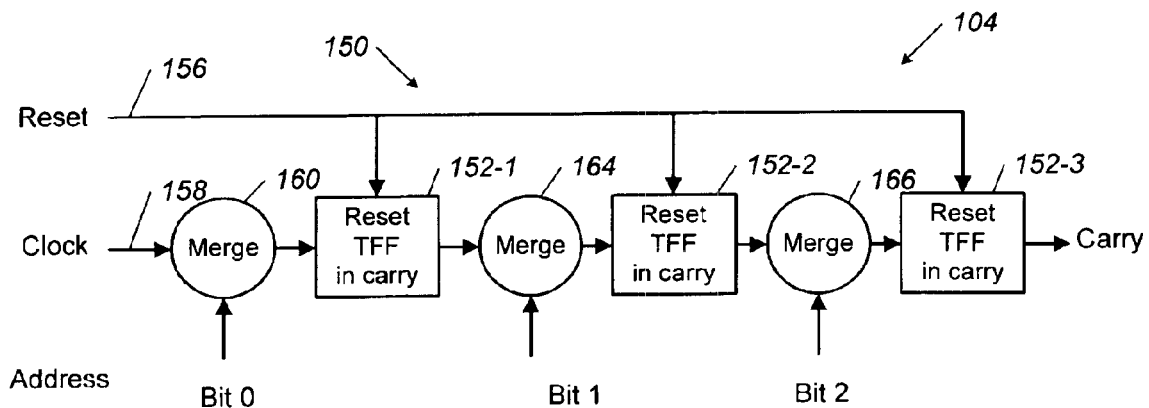
FIG. 6 illustrates the decoder for the crossbar switch of FIG. 3 in more detail.

Referring now to FIG. 6, the logic for the decoders 104 is illustrated. The decoder 104 converts the binary address input into a serial address. The binary address is an N-bit binary address. For m output columns, the relation $2^N \geq m$ must be satisfied. The decoder 104 includes an N-bit counter 150 that includes N toggle flip-flops (TFF) 152. In a preferred embodiment, the TFFs 152 are divide-by-2 T1FF flip-flops which are standard RSFQ gates. The decoder 104 receives a reset input 156 and a clock input 158. For example, bit 0 of the N-bit binary address is merged at 160 with the clock input 158. Bit 1 of the N-bit binary address is merged at 164 with an output of the TFF 152-1. Bit 2 of the N-bit binary address is merged at 166 with an output of the TFF 152-2. An output of the TFF 152-3 is a carry output. In use, the counter is initially reset. The N-bit binary address sets an initial state of the N-bit counter 150. The counter is clocked and a carry output is produced after $2^N$-address clock cycles.

The crossbar switch 100 according to the present invention is preferably implemented using superconductor digital electronics. In a highly preferred embodiment, the crossbar switch 100 is implemented using rapid single flux quantum (RSFQ) logic. The crossbar switch 100 is self-routing and is ideally suited for network routers. The crossbar switch is capable of 40 Gbps data rates per line. The crossbar switch provides a reconfiguration time equal to the length of the binary address (i.e. a few clock cycles), a switch size of 256×256, 1024×1024, or greater and a compact overall size of a few cubic centimeters. The crossbar switch has relatively low power dissipation of approximately 0.1 to 1 Watt.

The crossbar switch 100 includes the use of a single serial select input per row. The crossbar switch 100 includes select logic that allows the serial address and the data to enter the crossbar in parallel, which reduces configuration time in the crosspoints to one clock cycle. The logic in the decoder 104 converts the binary address input into the serial address. The scalable self-routing superconductor switch according to the invention addresses the speed, power dissipation and overhead problems that are associated with conventional superconductor switches.

Figure 7:
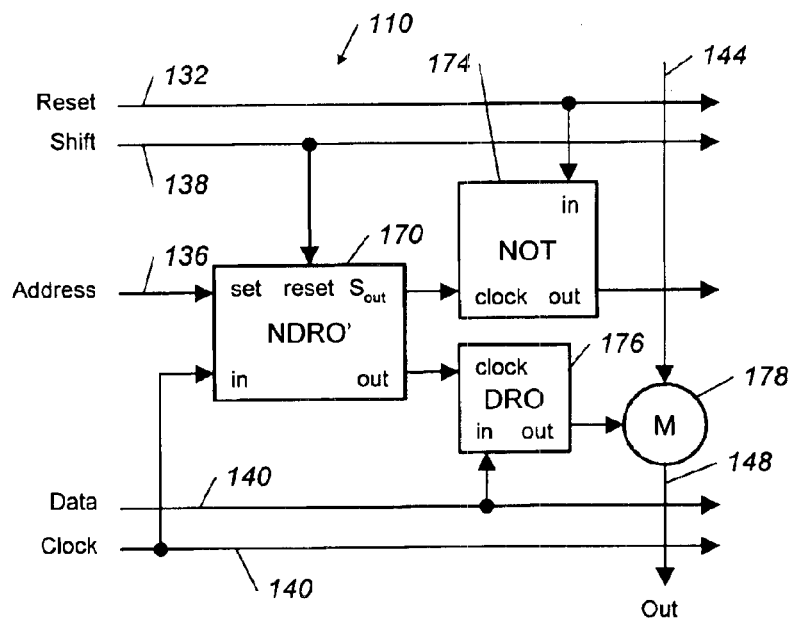
FIG. 7 is a schematic block diagram illustrating a preferred crosspoint.
Figure 8:
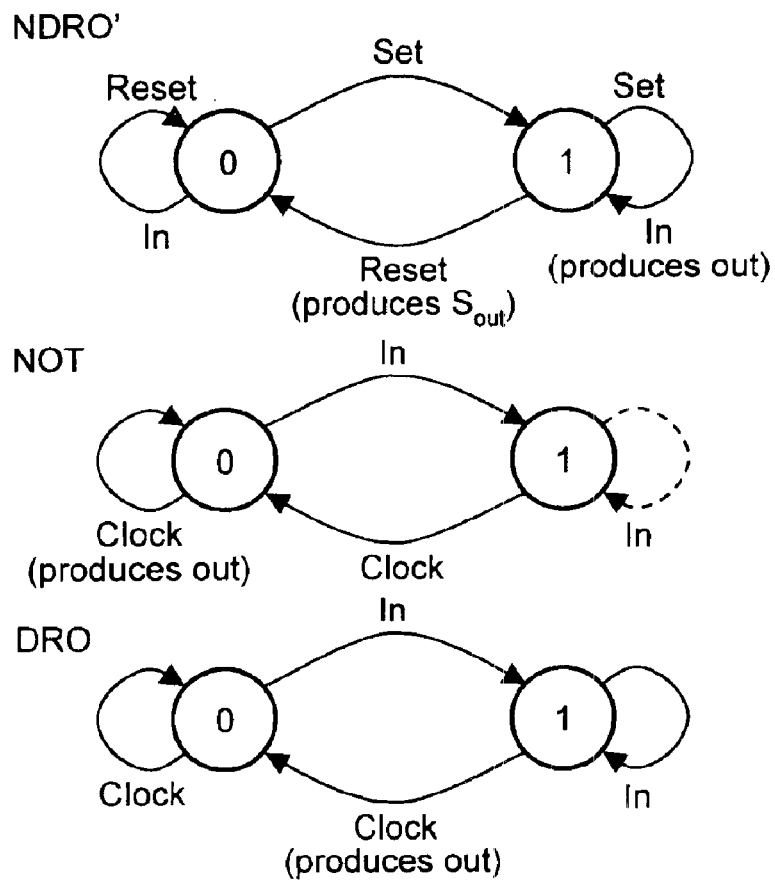
FIG. 8 illustrates Mealy state-transition diagrams for the non-destructive readout (NDRO), inverter (NOT), and destructive readout (DRO) circuits of FIG. 7.

Referring now to FIGS. 7 and 8, a preferred embodiment of the cross-point 110 is shown. For purposes of clarity, reference numerals from FIG. 4 have been used where appropriate to identify similar elements. The cross-point 110 includes a nondestructive readout (NDRO) circuit 170, an inverter (NOT) circuit 174, a destructive readout (DRO) 176, and a merge circuit 178. Preferably the NDRO, DRO and NOT circuits are known and standard RSFQ circuits.

The NDRO circuit 170 has a set input connected to the address line 136, an "in" input that is connected to the clock line 140, and a reset input that is connected to the shift line 138. The NDRO circuit 170 has an $S_{out}$ output that is connected to a clock input of the inverter circuit 174. The NDRO circuit 170 has an "out" output that is connected to a clock input of the DRO circuit 176. The Mealy state-transition diagram in FIG. 8 illustrates the operation of the NDRO circuit 170.

The inverter circuit 174 has an "in" input that is connected to the reset line 132 and an "out" output that is connected to an adjacent cross-point. The Mealy state-transition diagram in FIG. 8 illustrates the operation of the inverter circuit 174. The DRO circuit 176 has an "in" input that is connected to the data line 140 and an "out" output that is connected to the merge circuit 178. The Mealy state-transition diagram in FIG. 8 illustrates the operation of the DRO circuit 176. Skilled artisans will appreciate that the cross-points 110 may be implemented many other ways without departing from the spirit and scope of the invention.

Figure 9:
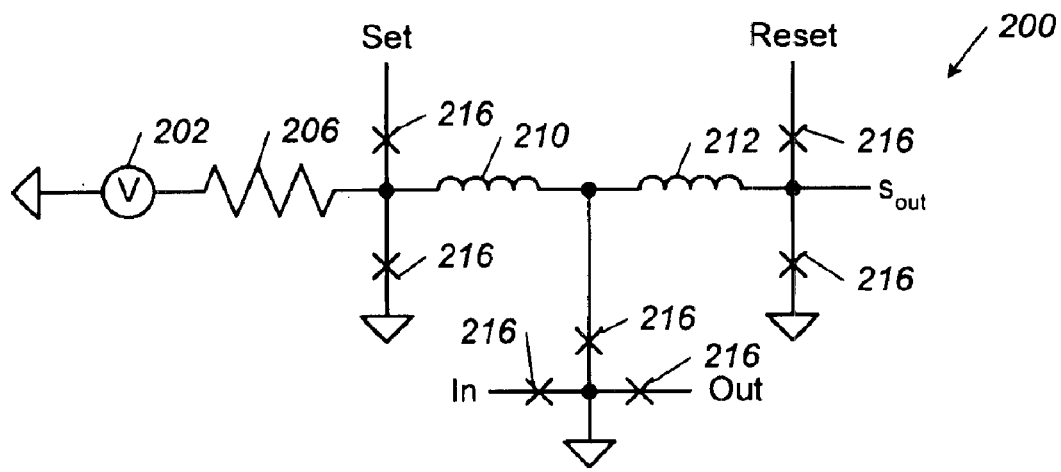
FIG. 9 is a schematic of a NDRO gate showing a $S_{out}$ tap.

Referring now to FIG. 9, an NDRO gate 200 with two outputs (out and $S_{out}$). The NDRO gate includes a dc voltage bias 202 connected to a resistor 206 and inductors 210 and 212. Set, reset, and inputs are connected by Josephson junctions 216.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A crossbar switch comprising:
   a crossbar matrix that includes n input rows of cross-points and m output columns of cross-points; and
   n decoders connected to said n input rows;
   wherein each of said n rows includes a single serial address input between said decoder and said cross-points;
   wherein each of said n rows includes a single shift input and a single data input;
   wherein a serial address and data enter said address input and said data input in parallel;
   wherein a shift sequence is transmitted on said single shift input, and wherein said data flows before said shift sequence on said shift input has completed.

2. The crossbar switch of claim 1 wherein said data shifted through said crossbar switch using a clock.

3. The crossbar switch of claim 2 wherein said clock is generated on-chip using a clock recovery circuit.

4. The crossbar switch of claim 1 wherein said decoders convert a binary address input into a serial address.

5. A crossbar switch comprising:
   a crossbar matrix that includes n input rows of cross-points and m output columns of cross-points; and
   n decoders connected to said n input rows;
   wherein each of said n rows includes a single serial address input between said decoder and said cross-points;
   wherein said decoders convert a binary address input into a serial address, and wherein said decoders include an N-bit counter including a plurality of divide-by-2 toggle flip-flops.

6. The crossbar switch of claim 5 wherein said crossbar switch is implemented using superconductor digital electronics.

7. The crossbar switch of claim 6 wherein said crossbar switch is implemented using rapid single flux quantum (RSFQ) logic.

8. A crossbar switch comprising:
   a crossbar matrix that includes n input rows of cross-points and m output columns of cross-points; and
   n decoders connected to said n input rows;
   wherein each of said n rows includes a single serial address input between said decoder and said cross-points;
   and wherein one of said cross-points includes:
      a nondestructive readout (NDRO) circuit having first, second and third inputs and first and second outputs, wherein said first input is connected to said serial address line, said second input is connected to a shift line, said third input is connected to a clock line;
      an inverter having first and second inputs and a first output, wherein said first input of said inverter is connected to said first output of said NDRO circuit and said second input of said inverter is connected to a reset line; and
      a destructive readout circuit having first and second inputs and a first output, wherein said first input is connected to said first output of said NDRO circuit and said second input is connected to a data line.

9. A crossbar switch comprising:
   a crossbar matrix that includes n input rows of cross-points and m output columns of cross-points; and
   n decoders connected to said n input rows;
   wherein each of said n rows includes only a single serial address input and a single data input, and wherein a serial address and data enter said serial address input and said data input in parallel;
   wherein said data is shifted through said crossbar switch using a clock, and wherein said clock is generated on-chip using a clock recovery circuit.

10. The crossbar switch of claim 9 wherein said decoders convert a binary address input into a serial address.

11. A crossbar switch comprising:
    a crossbar matrix that includes n input rows of cross-points and m output columns of cross-points; and
    n decoders connected to said n input rows;
    wherein each of said n rows includes only a single serial address input and a single data input, and wherein a serial address and data enter said serial address input and said data input in parallel;
    and wherein said decoder circuit includes an N-bit counter including a plurality of divide-by-2 toggle flip-flops.

12. The crossbar switch of claim 11 wherein said crossbar switch is implemented using rapid single flux quantum (RSFQ) logic.

13. A crossbar switch comprising:
   a crossbar matrix that includes n input rows of cross-points and m output columns of cross-points; and
   n decoders connected to said n input rows;
   wherein each of said n rows includes only a single serial address input and a single data input, and wherein a serial address and data enter said serial address input and said data input in parallel;
   and wherein one of said cross-points includes:
      a nondestructive readout (NDRO) circuit having first, second and third inputs and first and second outputs, wherein said first input is connected to said serial address input, said second input is connected to a shift line, said third input is connected to a clock line;
      an inverter having first and second inputs and a first output, wherein said first input of said inverter is connected to said first output of said NDRO circuit and said second input of said inverter is connected to a reset line; and
      a destructive readout circuit having first and second inputs and a first output, wherein said first input is connected to said first output of said NDRO circuit and said second input is connected to said data input.

14. A crossbar switch comprising:
   a crossbar matrix that includes n input rows of cross-points and m output columns of cross-points; and
   n decoders connected to said n input rows;
   wherein decoders convert a binary address input into a serial address;
   and wherein said decoder circuit includes an N-bit counter including a plurality of divide-by-2 toggle flip-flops.

15. The crossbar switch of claim 14 wherein each of said n rows includes a single serial address input and a single data input, and wherein a serial address and data enter said serial address input and said data input in parallel.

16. The crossbar switch of claim 14 wherein said crossbar switch is implemented using rapid single flux quantum (RSFQ) logic.

17. A crossbar switch comprising:
   a crossbar matrix that includes n input rows of cross-points and m output columns of cross-points; and
   n decoders connected to said n input rows;
   wherein said decoders convert a binary address input into a serial address;
   and wherein one of said cross-points includes:
      a nondestructive readout (NDRO) circuit having first, second and third inputs and first and second outputs, wherein said first input is connected to said serial address input, said second input is connected to a shift line, said third input is connected to a clock line;
      an inverter having first and second inputs and a first output, wherein said first input of said inverter is connected to said first output of said NDRO circuit and said second input of said inverter is connected to a reset line; and
      a destructive readout circuit having first and second inputs and a first output, wherein said first input is connected to said first output of said NDRO circuit and said second input is connected to a data line.

* * * * *